Patented June 30, 1931

1,812,145

UNITED STATES PATENT OFFICE

HANS FINKELSTEIN, OF UERDINGEN NIEDERRHEIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CELLULOSE ESTER LACQUER

No Drawing. Application filed July 13, 1928. Serial No. 292,595.

The present invention relates to improved cellulose ester lacquers.

In the industry of cellulose ester lacquers there is a great want for solvents which possess only a slight smell, remain neutral and which possess properties suitable for the most varied manners of use and especially for the manufacture of lacquers for application by brushing.

I have found that the monoalkyl ethers of propylene glycol and in particular those which correspond to the general formula $HO-C_3H_6-OR$ (in which R indicates an alkyl group with from 1 to 5 carbon atoms, such as the methyl, ethyl, propyl, iso-propyl, butyl, isobutyl, amyl or isoamyl group) are excellent solvents for cellulose esters and more particularly for cellulose nitrate, and meet nearly all requirements of practice. The said ethers possess only a very slight, pleasant smell, are non-hygroscopic and remain neutral and do not form acids even on prolonged storage, as is the case with the largely used esters such as amyl acetate.

The said ethers possess a very great dissolving power for all kinds of cellulose nitrate usually employed in the lacquer industry. Accordingly the solutions possess a comparatively low viscosity and can be mixed to a great extent with diluents possessing no dissolving power, without separation of the dissolved cellulose nitrate taking place. Particularly suitable diluents are for example benzene, toluene, xylene, aliphatic alcohols with from 1 to 4 carbon atoms, benzine and the like. Other solvents may also be employed in my improved lacquers, for example the mono- or dialkyl ethers of ethylene or butylene glycol, lactic esters, acetic esters, ketones and the like or mixtures of several such solvents.

The said monoalkyl ethers of propylene glycol need not be pure, but mixtures of several such ethers with each other or mixtures with the monoalkyl ethers of dipropylene glycol of the general formula $RO-C_3H_6-O-C_3H_6-OH$ which are sometimes obtained as by-products in the production of monoalkyl ethers of propylene glycol, may be employed.

The said ethers possess a very good dissolving power also for many natural and artificial resins compatible with the cellulose ester employed, for example artificial resins obtained by polymerization of vinyl esters. It is most advantageous to employ artificial resins obtained from cyclic ketones, such as cyclohexanone, with or without the aid of phenols and aldehydes. Also plasticizers and especially when employing cellulose nitrate, drying or nondrying oils may be added to the solutions, and the lacquers may be colored by the addition of suitable coloring matters so as to produce transparent or covering lacquers. When adding drying oils, such as linseed oil or wood-oil, it is advisable and sometimes necessary to employ further solvents, such as butanol, cyclohexyl acetate, cyclohexanone and the like or mixtures thereof and also resins, which are compatible with the cellulose ester and the drying oils, such as colophony or an artificial resin obtainable from cyclohexanone, are advantageously added.

It will be obvious from the foregoing explanations that it is possible according to my present invention to vary the properties of the lacquers within very wide limits and to fulfill all requiremnts of practice, for example as regards the hardness, suppleness, adhesiveness, and lustre of the coatings, the time required for drying and the like. If a very quick drying of the lacquer be desired, the content thereof of propylene glycol ether should be rather low for example from 5 to 15 per cent, the said solvents being vaporized rather slowly.

The following examples will further illustrate the nature of my invention which, however, is not limited to these examples. The parts are by weight.

*Example 1*

100 parts of cellulose nitrate are dissolved in 400 parts of propylene glycol monoethyl ether, and the solution is diluted with 500 parts of toluene. The lacquer forms highly and transparent coatings.

The toluene may be replaced by benzine, xylene, ethyl alcohol or other suitable diluents.

*Example 2*

100 parts of cellulose nitrate and 20 parts of an artificial resin prepared from cyclohexanone with or without formaldehyde and phenol, are dissolved in 200 parts of propylene glycol monoethyl ether, 100 parts of ethylene glycol monobutyl ether, 50 parts of butylene glycol monoethyl ether and 80 parts of cyclohexanone, whereupon 25 parts of tricresyl phosphate and a mixture of 150 parts of ethyl alcohol and 300 parts of toluene is added.

In the place of tricresyl phosphate other plasticizers such as esters of phthalic acid may be added to the solution which forms firmly adhering coatings of high lustre. The lacquer may be colored by suitable coloring matters for example rhodamine B or Prussian blue and the like.

This application is a continuation in part of my application for Patent Ser. No. 76,107, filed December 17, 1925.

What I claim is:

1. A composition of matter comprising cellulose nitrate, an artificial cyclic ketone resin, and a solvent therefor containing a substantial proportion of a propylene glycol monoalkyl ether corresponding to the general formula $HO—C_3H_6OR$ (in which R indicates an alkyl group with from 1 to 5 carbon atoms.

2. A composition of matter comprising cellulose nitrate, an artificial cyclic ketone resin, and a solvent therefor containing a substantial proportion of propylene glycol monoethyl ether.

3. A composition of matter comprising cellulose nitrate, an artificial resin prepared from cyclohexanone, phenol and formaldehyde, and a solvent therefor containing a substantial proportion of a propylene glycol monoalkyl ether corresponding to the general formula $HO—C_3H_6—OR$ (in which R indicates an alkyl group with from 1 to 5 carbon atoms).

4. A composition of matter comprising cellulose nitrate, an artificial resin prepared from cyclohexanone, phenol and formaldehyde, and a solvent therefore containing a substantial proportion of propylene glycol monoethyl ether.

5. A composition of matter comprising 100 parts cellulose nitrate, 20 parts of an artificial resin prepared from cyclohexanone, phenol and formaldehyde, 200 parts of propylene glycol monoethyl ether, 100 parts of ethylene glycol monobutyl ether, 50 parts of butylene glycol monoethyl ether, 80 parts of cyclohexanone, 150 parts of ethyl alcohol, 300 parts of toluene, and 25 parts of tricresyl phosphate.

In testimony whereof I have hereunto set my hand.

HANS FINKELSTEIN.